(12) United States Patent
Finkbeiner et al.

(10) Patent No.: US 6,787,944 B2
(45) Date of Patent: Sep. 7, 2004

(54) ELECTRODYNAMIC LINEAR DIRECT DRIVE AND METHOD FOR PRODUCING A COIL SYSTEM THEREFOR

(75) Inventors: Matthias Finkbeiner, Mötzingen (DE); Ralf Hartramph, Albershausen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/381,525

(22) PCT Filed: Jul. 19, 2002

(86) PCT No.: PCT/EP02/08034
§ 371 (c)(1),
(2), (4) Date: Mar. 26, 2003

(87) PCT Pub. No.: WO03/015247
PCT Pub. Date: Feb. 20, 2003

(65) Prior Publication Data
US 2004/0100152 A1 May 27, 2004

(30) Foreign Application Priority Data
Aug. 7, 2001 (DE) ........................ 101 38 681

(51) Int. Cl.[7] .............................................. H02K 41/00
(52) U.S. Cl. ............................. 310/12; 29/596; 29/598
(58) Field of Search ............................. 310/12, 13, 14; 29/596, 598

(56) References Cited
U.S. PATENT DOCUMENTS

| | | | | |
|---|---|---|---|---|
| 4,460,855 A | | 7/1984 | Kelly ........................ 318/135 |
| 4,545,209 A | * | 10/1985 | Young .............................. 62/6 |
| 4,839,543 A | * | 6/1989 | Beakley et al. ................ 310/12 |
| 4,912,746 A | * | 3/1990 | Oishi ........................... 310/12 |
| 5,712,517 A | * | 1/1998 | Schmidt et al. ............... 310/45 |
| 6,262,648 B1 | * | 7/2001 | Lammers ..................... 335/229 |
| 6,313,552 B1 | * | 11/2001 | Boast .......................... 310/14 |
| 6,538,412 B1 | * | 3/2003 | Klose et al. ................ 318/801 |

FOREIGN PATENT DOCUMENTS

| | | |
|---|---|---|
| DE | 19709044 A1 | 11/1997 |
| DE | 19906638 C1 | 8/2000 |
| EP | 0774826 A1 | 5/1997 |
| JP | 58-36162 | 3/1983 |
| JP | 60-102866 | 6/1985 |
| WO | WO98/37616 | 8/1998 |

* cited by examiner

Primary Examiner—Thanh Lam
Assistant Examiner—Judson H. Jones
(74) Attorney, Agent, or Firm—Hoffmann & Baron, LLP

(57) ABSTRACT

An electrodynamic direct linear drive (1) has a coil system (2) with a plurality of coaxially sequentially following drive coils (3). In the interior or on the external periphery of the coil system (2) a magnet system (6) is arranged, which is designed in the form of a component of an output part (8) able to be moved in relation to the coil system (2). On the opposite side of the magnet system (6) a return circuit means (15) is arranged internally or externally of the coil system (2). In order to achieve a high energy density axially adjacent drive coils (3) contact each other directly. Furthermore a method for the production of the coil system (2) is provided.

15 Claims, 7 Drawing Sheets

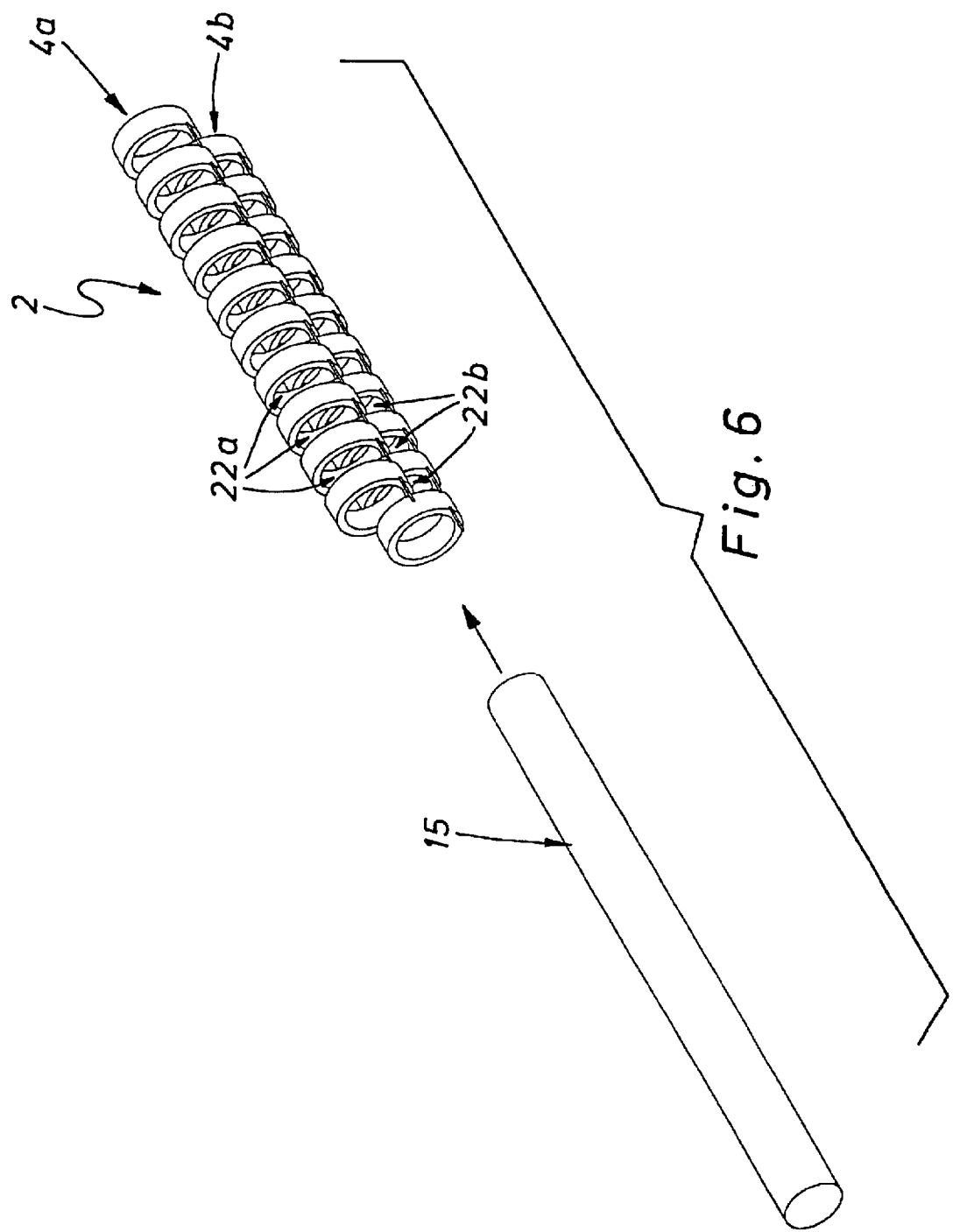

ELECTRODYNAMIC LINEAR DIRECT DRIVE AND METHOD FOR PRODUCING A COIL SYSTEM THEREFOR

This application is the National Stage of PCT Application No. PCT/EP02/08034 filed on Jul. 19, 2002 which claims priority to German Application No. 101 38 681.8 filed on Aug. 7, 2001.

FIELD OF THE INVENTION

The invention relates to an electrodynamic direct linear drive and to a method for the production of a coil system comprising a plurality of coaxially arranged and sequentially following drive coils of an electrodynamic direct linear drive.

BACKGROUND OF THE INVENTION

Electrodynamic direct linear drives, which are as a rule termed linear motors, generally possess a coil system able to be excited with a switched exciting voltage and a magnet system which is able to be moved in relation to the coil system and comprises a plurality of axially sequentially placed permanent magnets. The magnet system is a component of an output drive part able to be moved in relation to the coil system in the longitudinal direction thereof. By exciting the coil system the magnet system, and with it the entire output drive part, may be caused to perform a linear movement.

The coil system, which possesses a plurality of coaxially sequentially following drive coils, has so far normally been mounted on a coil carrier has, which is normally manufactured of synthetic resin material and possesses winding chambers divided off from one another by partitions, into which the drive coils are wound. The coil system is then, together with the coil carrier mounted on a return circuit means rendering possible a magnetic return path for the magnet system.

In order to provide for maximum power and energy density, there should be only minimum air gaps within the coil system. The consequently resulting requirements as regards the winding operation during the production of the coil system are relatively exacting and have an disadvantageous effect on the costs of production.

SUMMARY OF THE INVENTION

One aim of the present invention is to provide an electrodynamic direct linear drive and also a coil system for such a direct linear drive, in the case of which a higher power density may be obtained.

In order to attain this object an electrodynamic direct linear drive is provided comprising a coil system having a plurality of coaxially sequentially following drive coils, which is adapted to be subjected to a switched exciting voltage, a magnet system comprising permanent magnets, said permanent magnets being arranged axially sequentially following each other, said permanent magnets being arranged inside the internal space or on the external periphery of the coil system, said magnet system being designed as a component of an output drive part able to be moved in relation to the coil system in the longitudinal direction thereof, and furthermore comprising a return circuit means provided on the opposite side of the magnet system and internally or externally on the coil system, axially adjacent drive coils of the coil system resting directly contacting each other free of intermediate gaps.

Accordingly there is a departure from the prior art to the extent that the partitions of a coil carrier used in it between adjacent drive coils of the coil system are dispensed with and the mutually adjacent drive coils are directly in contact with one another. The volume occupied in the prior art by the partitions may therefore be filled by the copper material of the drive coils, this meaning that there is a higher degree of copper filling and therefore a substantially higher energy density. A consequence of this densely packed coil arrangement is the possibility of producing higher output forces.

Advantageous further developments of the electrodynamic direct linear drive will appear from the dependent claims.

In the case of the direct linear drive in accordance with the invention it is possible for a coil carrier to be dispensed with. More particularly, it is possible for the coil system to contact the return circuit means directly or if anything with the interposition of only of a thin insulation Layer on the return circuit means so that in this case as well there are no substantial intermediate spaces.

On the basis of the design in accordance with the invention it is possible for different specific configurations to be evolved. It is for example possible to design the return circuit means in a annular form and to arrange the coil system within the return circuit means so that it is coaxially surrounded, by the return circuit means. Furthermore, there is the possibility of designing the return circuit means in the form of a rod and placing in the internal space delimited by the coil system so that it is coaxially surrounded by the coil system.

It is convenient for the coil system to comprise at least two, as for instance two or three, respectively continuously wired coil system parts, which respectively comprise several drive coils, arranged coaxially to each other, the drive coils of the coil system parts being arranged alternatingly in sequence. Between axially adjacent drive coils of a respective coil system part it is convenient for a spanning section to extend, which spans the axial intermediate space, of the coil wire of the respective coil system part. The latter extends at the same level as the external periphery of the respective coil system part and extends past the at least one drive coil, arranged in the intermediate space, of the at least one further coil system part adjacent to the external periphery.

Consequently it is possible to prevent the spanning section of the coil wire of a respective coil system part from running on the coil floor of adjacent drive coils of another coil system part, something which ensures the production of an ideal coil form in the case of all drive coils. The arrangement of the coil wire over adjacent drive coils of another coil system part is accordingly not of crucial importance and does not interfere with the winding or degree of filling of the adjacent drive coils.

The individual coil system parts preferably each constitute a respective self-supporting, dimensionally stable structure with mutually coaxial drive coils. The individual coil system parts may be shaped like a comb and plugged in a direction athwart their longitudinal axis into each other. The dimensional stability may be obtained by the use of so-called bonding enamel wire as a coil winding wire, the coil wire consisting of copper being surrounded by a layer, which melts under the action of heat with the result that adjacent wire sections are joined together by the fused layer composition.

The initially mentioned object is furthermore to be attained by a method for the production of a coil system, comprising a plurality of coaxially sequentially following drive coils, of an electrodynamic direct linear drive, at least two continuously wired coil system parts being separately manufactured from each other, which respectively comprise a plurality of drive coils arranged coaxially and with a clearance between them, between which, at the same level as the external periphery, a spanning or bridging section of the continuous coil wire extends with the result that there is a comb-like structure, such coil system parts with a comb-like structure being plugged into one another in a direction athwart their longitudinal extent so that all drive coils are arranged coaxially to each other and the bridging or spanning sections of the coil wire extend past the at least one drive coil inserted into the spanned intermediate space of at least one further coil system part on the external periphery.

Owing to this there is the possibility of separately manufacturing the coil system parts, the assembly thereof being simply performed by plugging the resulting comb-like structures of the coil system parts into each other in the longitudinal direction, the drive coils of the respective one coil system part fitting into the intermediate adjacent drive coils of the one or respectively other coil system part or coil system parts.

Handling becomes particularly simple, if the individual coil system parts are baked after winding so that self-supporting, demensionally stable structure are produced.

The winding of the coil system parts is preferably implemented using a winding tool, which comprises axially spaced winding chambers resembling annular grooves, into which the coil wire for the production of the drive coils is wound.

The winding chambers are preferably, in the case of the winding tool employed, provided on a tool casing which comprises a plurality of casing segments, which are placed on the external periphery of an elongated tool core with a spacing from each other, and which may be shifted radially inward into the internal space of the coil system part to "demold" the coil system part produced, after the tool has been previously removed.

BRIEF DESCRIPTION OF THE DRAWINGS

The invention will now be described in detail with reference to the accompanying drawings.

FIGS. 1 through 6 illustrate various different stages of a method for the production of a coil system for an electrodynamic direct linear drive.

FIGS. 7 through 9 respectively depict in a diagrammatic form an electrodynamic direct linear drive 1 in a perspective elevation.

DETAILED DESCRIPTION OF THE PREFERRED EMBODIMENTS

In both possible designs a coil system 2 is present, which comprises a plurality of coaxially sequentially following drive coils 3.

Figure 5:
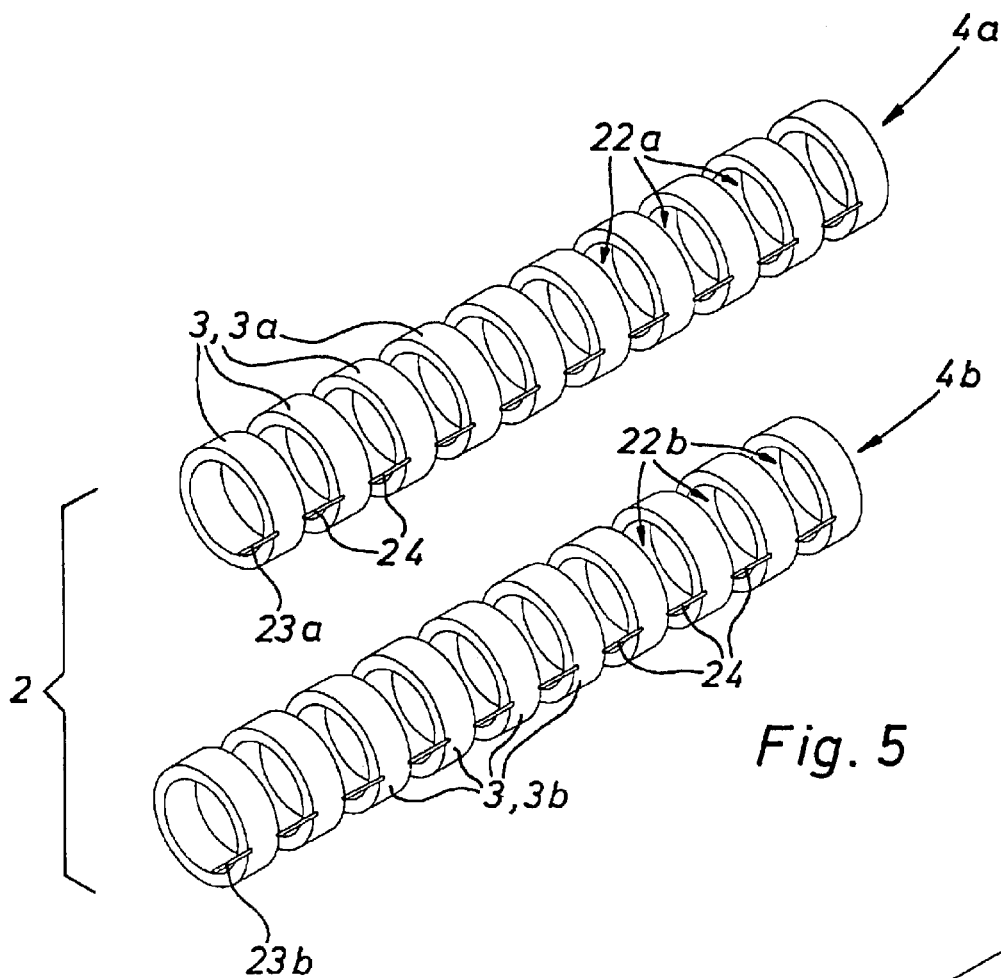

The coil system part 2 is composed of a plurality of coil system parts 4a and 4b, which in the FIGS. 5 and 6 are illustrated separately. Each coil system 4a and 4b has a plurality of mutually parallel and axially sequentially following drive coils 3, which are additionally referenced with numerals 3a and 3b etc for better distinction.

Figure 2:
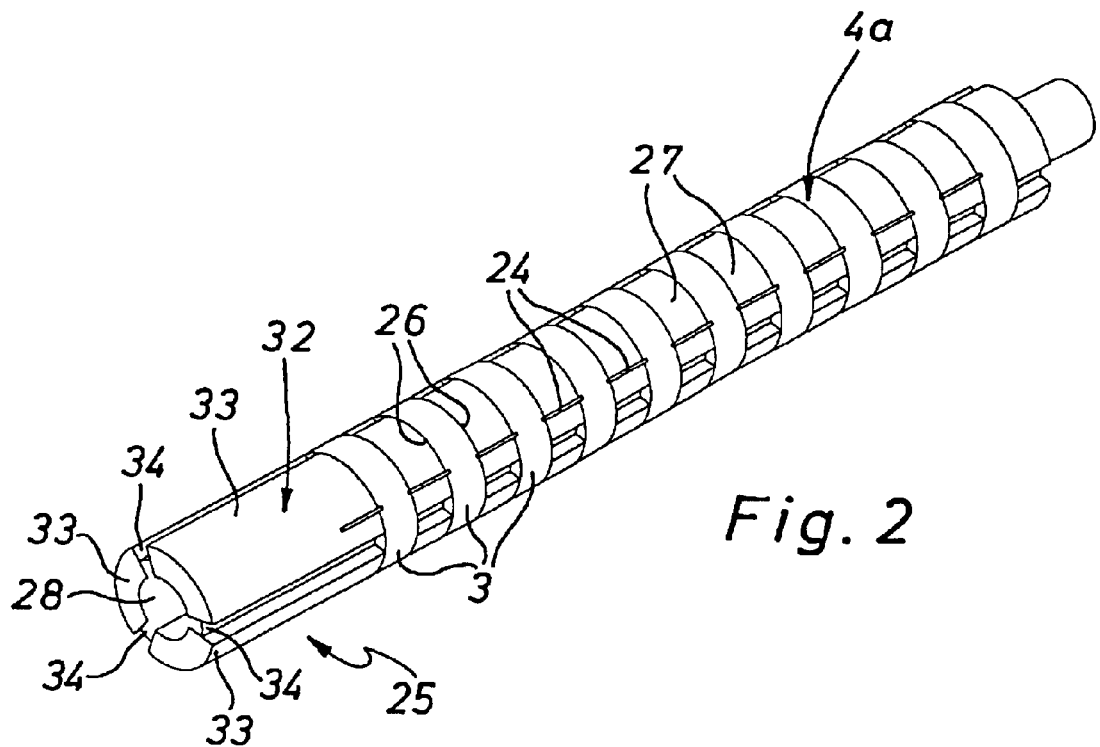
Figure 9:
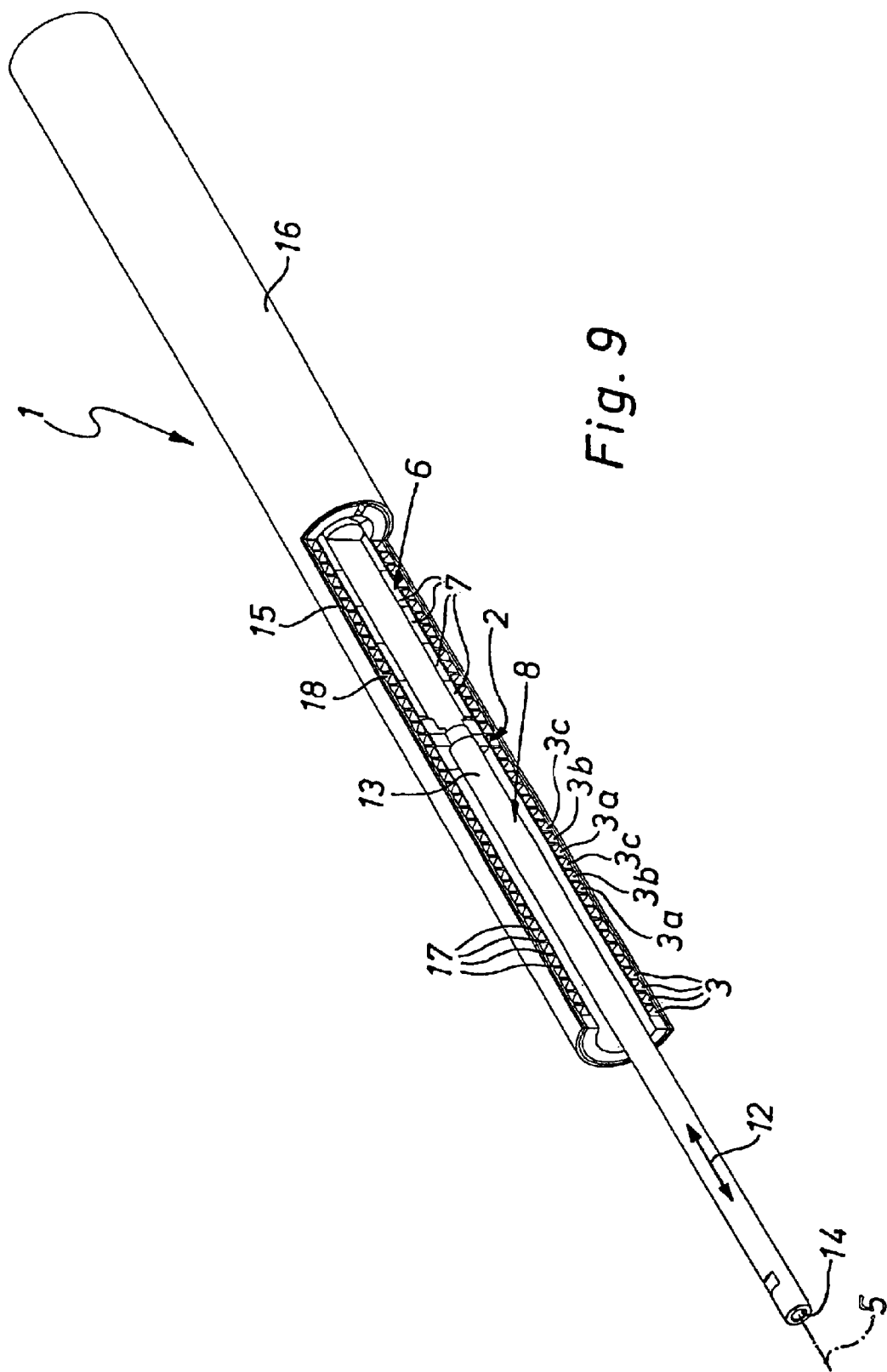
FIG. 9 shows an alternative form of an electrodynamic direct linear drive, which is fitted with a coil system produced in accordance with the invention.

In the case of the working embodiment of FIG. 2 in all two coil system parts 4a and 4b are present. The direct linear drive in accordance with FIG. 9 is fitted with three such coil system parts, the drive coils 3 of the third coil system part being additionally referenced 3c.

Within a respective coil system 2 the coil system parts 4a and 4b are preferably so arranged that the drive coils 3a and 3b and also 3a, 3b and 3c are arranged in alternating succession.

By means of control means, not illustrated in detail, the coil system 2 may be supplied with a switched exciting voltage, the coil system parts being electrically excited repeatedly with a time interval left between such excitations. Owing to this a magnetic field travelling in the direction of the longitudinal axis of the system 2 is produced.

Figure 7:
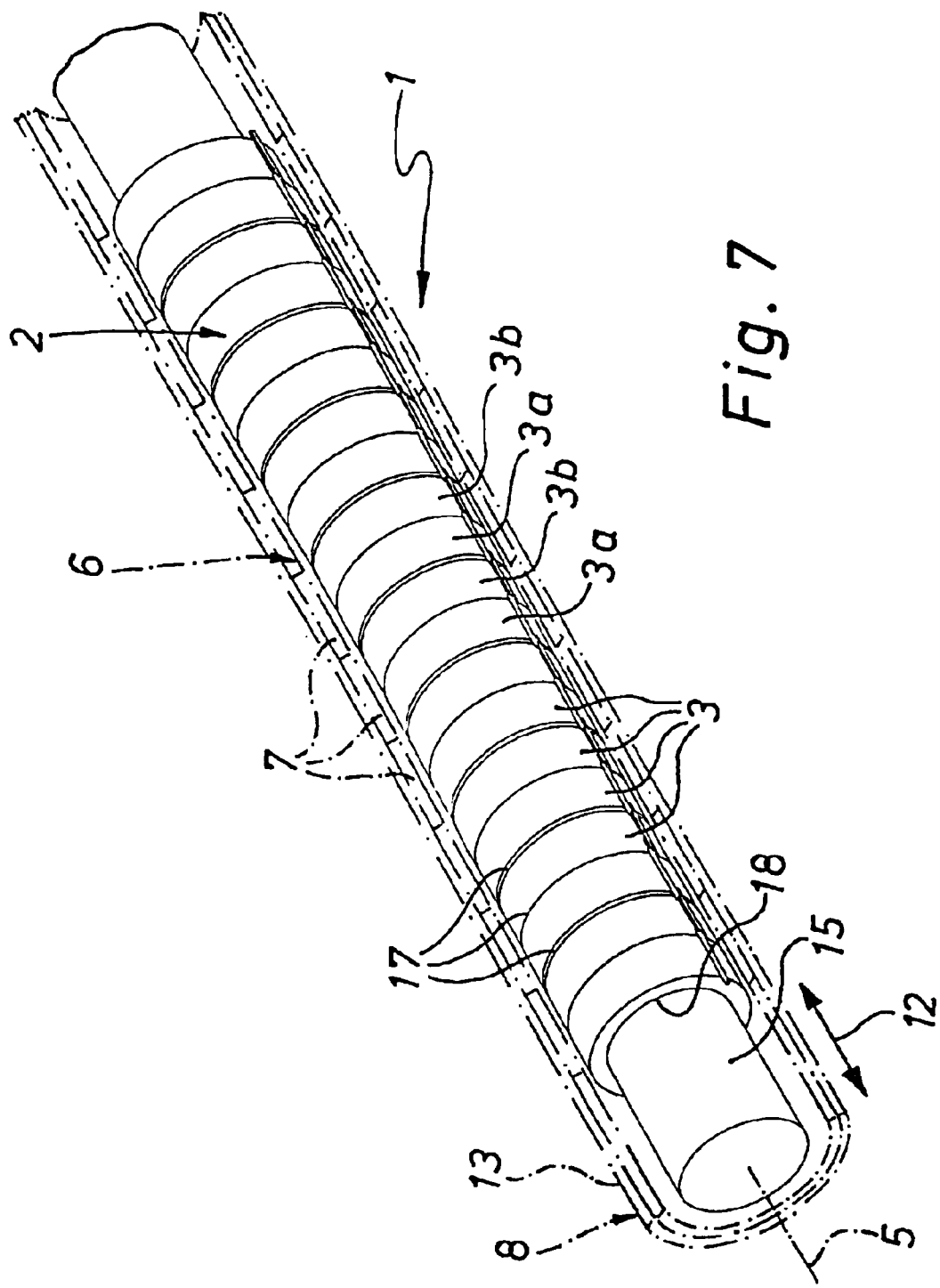
FIG. 7 a diagrammatic representation of an electrodynamic direct linear drive which is fitted with the coil system produced in accordance with FIGS. 1 through 6.

Each direct linear drive 1 is furthermore provided with a permanent magnet system 6, which is merely indicated in chained lines in FIG. 7. The magnet system 6 comprises a plurality of axially following permanent magnets 7, which are, in the working example, designed form of rings. Preferably, there is a radial magnetization of the permanent magnets 7, directly adjacent permanent magnets 7 having opposite magnetizations.

In the working embodiment of FIG. 7 the magnet system 6 is arranged. on the external periphery of the coil system 2 and surrounds same coaxially. In the working embodiment of FIG. 9 the magnet system 6 is located in the interior of the coil system 2 and is surrounded by same.

The magnet system 6 is designed in the form of a component of an output drive part 8 able to be moved in the longitudinal direction of the coil system in relation to same. The possible linear motion of the output drive part is indicated in FIGS. 7 and 9 at 12 by a double arrow.

In the working embodiment depicted in FIG. 7 the magnet system 6 is seated coaxially on the internal face of a tubular magnet carrier 13, which is provided, in a manner not specially shown, with means which render possible the attachment of an object to be moved. In the working embodiment illustrated in FIG. 9 the magnet carrier 13 is rod-like in shape and protrudes at a terminal side from the tubular coil system 2. The latter is at the end provided with attachment means 14 for the attachment of an object to be moved.

In the case of both direct linear drives the coil system 2 functions as a stator and the magnet system 6 as an armature moving linearly in relation to the stator. For stationarily fixing the coil system 2 in place a return circuit means 15 may be employed, which favors return of the magnetic fields. The return circuit means 15 is placed on the internal or, respectively, external side of the coil system 2 opposite to the magnet system 6 and is accordingly located in the working example of FIG. 7 in the internal space of the coil system 2 whereas in the case of the embodiment of FIG. 9 it is on the external periphery of the coil system 2.

The return circuit means 15 comprises a ferromagnetic body, which in the embodiment of FIG. 7 is rod-like in structure and is coaxially surrounded by the coil system 2. In the working example of FIG. 9 the return circuit means 15 is tubular in design and the coil system 2 is arranged coaxially and surrounds it.

The coil system 2 and the return circuit means 15 are able to be moved in the longitudinal direction in relation to one another. In the working example of FIG. 9 the return circuit means 15 is surrounded by a casing tube 16, which practically constitutes the housing of the direct linear drive 1. In the working embodiment illustrated in FIG. 7 the return circuit means 15 is secured to the rear in a manner not illustrated in detail on a holding structure.

If the coil system 2 is supplied with a switched exciting voltage, the electromagnetic fields will cooperate the permanent magnet fields of the magnet system 6 and cause the linear movement 12 of the magnet system 6 and, respectively, of the output drive part 8 fitted with same in relation to the stationary coil system 2 and the return circuit means 15. This linear motion may be transmitted, for example to move an object. Possibilities of use are for instance to be found in the automation sector in connection with manufacturing and assembly tasks.

Direct linear drives are capable of exerting high output forces. The reason for this is to be found more particularly in the high energy density of the coil system 2. This is due to a minimum of air gaps, inter alia owing to the fact that axially spaced drive coils 3 of the coil system 2 abut each other directly without and intermediate space. These contact areas are marked in the drawing at 17.

Whereas conventional linear motors have coil systems, in the case of which the drive coils are wound on a separate dimensionally stable coil carrier normally consisting of synthetic resin, in the case of the illustrated direct linear drives there is no such coil carrier. As a result there-is no need either to have the partition normally provided with such coil carriers between adjacent drive coils 3 with the result that the latter can contact each other and there are no air gaps or only extremely small gaps.

Owing to the absence of any separate coil carrier there is furthermore the possibility, adopted in the working example, of placing the drive coils 3 so as to make direct contact at the associated return circuit means 15 so that furthermore there are no intermediate spaces between the drive coils 3 and the return circuit means 15 in the transitional zone referenced 18. However, it is considered advisable, it may be expedient to provided a thin layer of insulation in between, which however may be in the form of a film or foil, since it does not have any support function and consequently does not have to possess any inherent stiffness.

Figure 8:
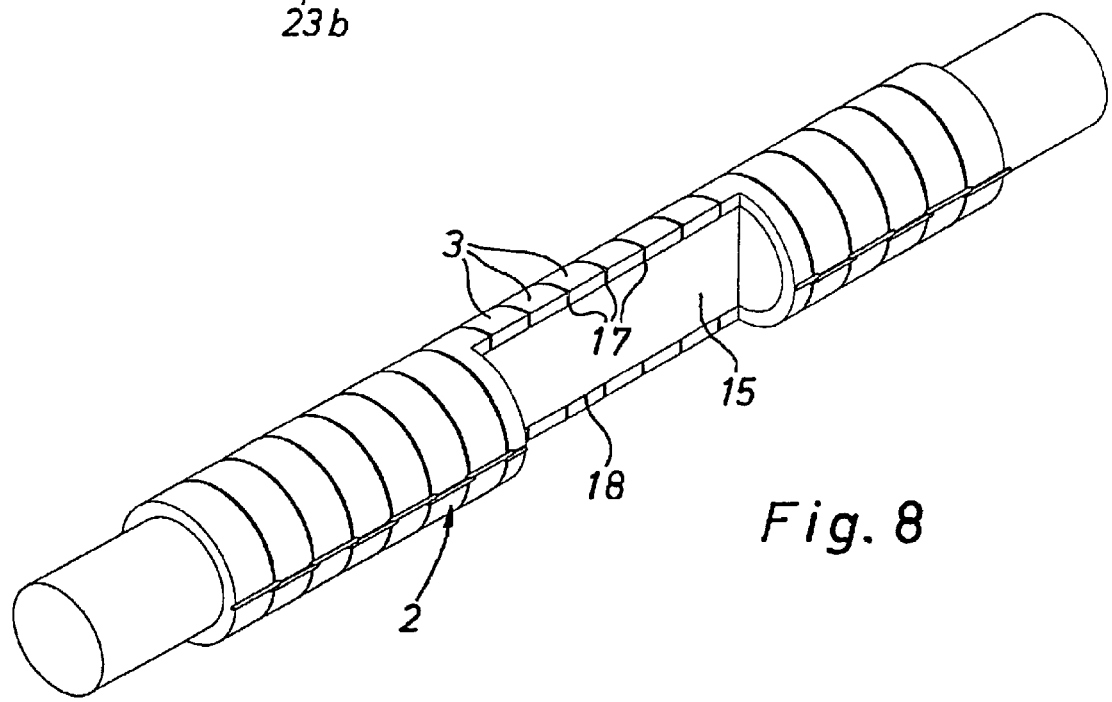
FIG. 8 shows the unit, present in the direct linear drive in accordance with FIG. 7, comprising a coil system and return circuit means in a partly broken away manner of representation.

The gap-free contact zones 17 between adjacent drives coils 3 and the gapless transitional zones 18 between the drive coils 3 and the return circuit means 15 are indicated particularly clearly in the partly fragmentary view of FIG. 8. Here in a separate view the reader will see a coil system placed on a rod-like return circuit means 15, as is employed in the case of direct linear drive of FIG. 7.

Further details of the advantageous structure of the direct linear drive will appear also from FIGS. 1 through 6, which illustrate a particularly convenient method for the manufacture of the coil system 2 and its provision with a return circuit means 15. The method of manufacture is in relation to the manufacture of a two phase coil system, that is to say a coil system 2 having two coil system parts 4a and 4b as is the case with the direct linear drive in accordance with FIG. 7.

A significant aspect of the method of manufacture is that the coil system parts 4a and 4b constituting the coil system are produced separately from each other and only then fitted together. FIG. 5 shows the two separately manufactured coil system parts 4a and 4b in the still separate condition, whereas FIG. 6 indicates the assembly in order to produce the system 2 as such.

The coil system parts 4a and 4b are characterized in that their drive coils 3, 3a and, respectively, 3 and 3b are arranged with an axial clearance between them so that between adjoining drive coils 3, 3a and, respectively, 3 and 3b of a respective coil system 4a and 4b of a respective coil system part 4a and 4b and axial intermediate space 22a and 22b is present. However the drive coils 3a and 3b are electrically wired together within a respective coil system part 4a and 4b since they are made parts of continuous coil wire 23a and 23b. The transition between adjacent drive coils 3a and 3b is, within a respective coil system part 4a and 4b, by way of spanning sections 24 of the associated coil wire 23a and 23b. These spanning sections 24 are characterized in that they extend at the same radial level as the external periphery of the respective coil system part 4a and 4b, that is to say generally at the same distance from the center of the coil system part 4a and 4b as the external periphery of the drive coils 3a and 3b wound using the coil wire 23a and 23b.

Figure 1:
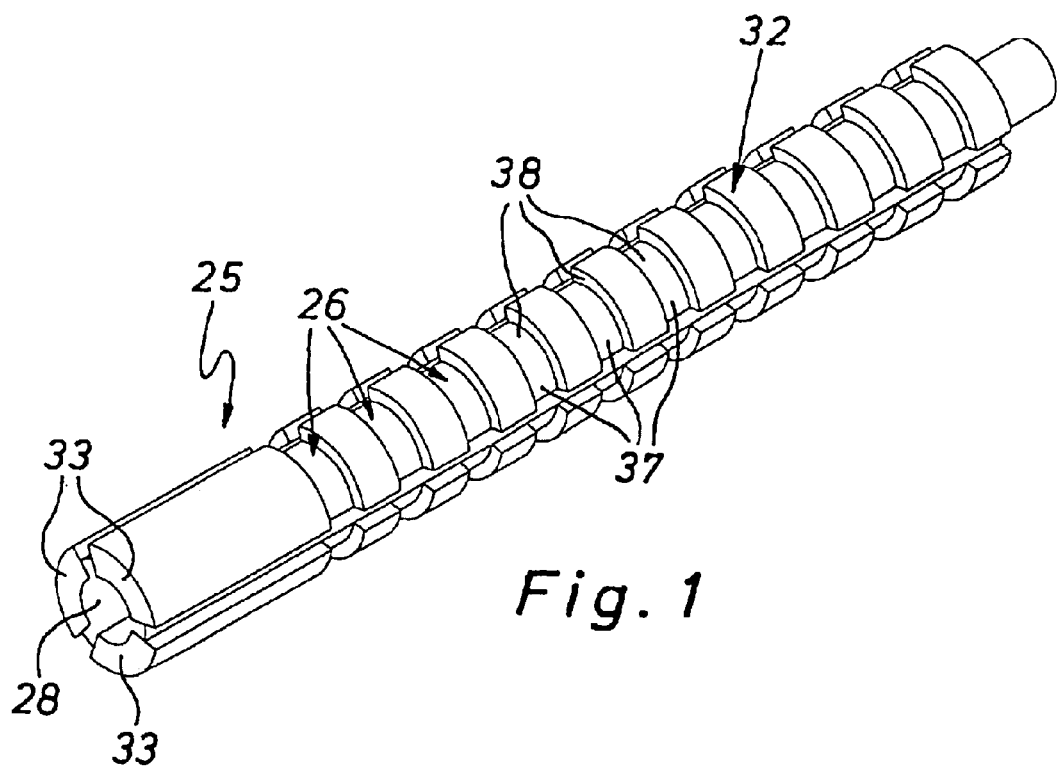

For the manufacture of each respective coil system part 4a and 4b use is best made of a winding tool 25 illustrated in FIGS. 1 through 4. This winding tool 25 has, in its state ready for winding coil wire, an elongated form as indicated in FIG. 1 and at its external periphery is provided with axially spaced winding chambers 26 like annular grooves, whose spacing apart is equal to the desired distance apart of the drive coils 3 within the associated coil system part. For the production of the drive coils 3 the coil wire is wound around the winding tool 25 and simultaneously laid in the winding chambers 26 in sequence with the result that windings 3 result. FIG. 2 shows a condition with a coil system part 4a completely wound by the winding tool 25, in the case of which the drive coils 3 fill the winding chambers 26 and the spanning sections 24 of the coil wire are extended past the partitions 27, remaining between the adjacent winding chamber 26, of the winding tool 25.

Since it is only at the start of a respective drive coil 3 that radial guidance of the wire in an inward direction toward the floor of the respective winding chamber 24 is required and the spanning sections 24 are provided radially to the outside, it is possible for the drive coils 3 to be optimally wound, something ensuring a high copper filling coefficient.

In order to remove the wound coil system part 4a without any trouble from the winding tool 25 (the same applying for the coil system part 4b produced in a similar manner) the winding tool 25 is made in several parts. In the case of the particularly advantageous structure in the example the winding tool 25 possesses an elongated tool core 28 and a tool casing 32 arranged in the operational state on the external periphery of the tool core 28.

The tooth casing 32 defines the winding chambers 26 and is for its part composed of several parts, it having in the working example several casing segments 33, in the present case three thereof. These casing segments 33 are mounted on the external periphery of the tool core 28 so as to have a spacing between them in the peripheral direction of the tool core 28. The slot-like radially extending intermediate spaces present between them are indicated at 34.

In order to secure the casing segments 33 at the desired distance apart on the tool core 28, the latter preferably possesses a number, equal to the number of casing segments 33, of longitudinal ribs 35 or other spacing elements on the external periphery, the casing segments 33 being able to be fitted in an interlocking manner into the intermediate spaces 36, present between adjacent longitudinal ribs 35, on the periphery of the tool core 28.

The radial extent of the longitudinal ribs 35 is smaller than the radial wall thickness of the tool casing 32 so that they terminate within the winding chambers 26 at a radial distance short of the external periphery of the tool casing 32 and more especially at the same level as the floors 37 of circularly arcuate grooves 38 in the external periphery of the casing segments 33, which join together in the mounted state on the tool core 28 to form the winding chambers 26.

For the manufacture of a coil system part 4a the first step is consequently to assembly the winding tool 25 in the operational condition as illustrated in FIG. 1. After this the continuous coil wire 23a is wound around the tool casing 32 so that the arrangement in accordance with FIG. 2 results. In this phase the coil system part 4a is complete as regards the wiring thereof.

Then the enamel bonding operation is performed during which the entire arrangement is heated with the result that casing of the coil wire 23a fuses and adjacent sections of the coil wire are permanently bonded together or baked and the coil wire is also stiffened. The coil wire is for this purpose preferably in the form of copper wire with a thermally fusing coating. Such wire is generally termed bonding enamel wire.

Owing to such baking the coil system part 4a and 4b still mounted on the tool casing 32 achieves a high degree of dimensional stability and has a self-supporting structure.

Figure 3:
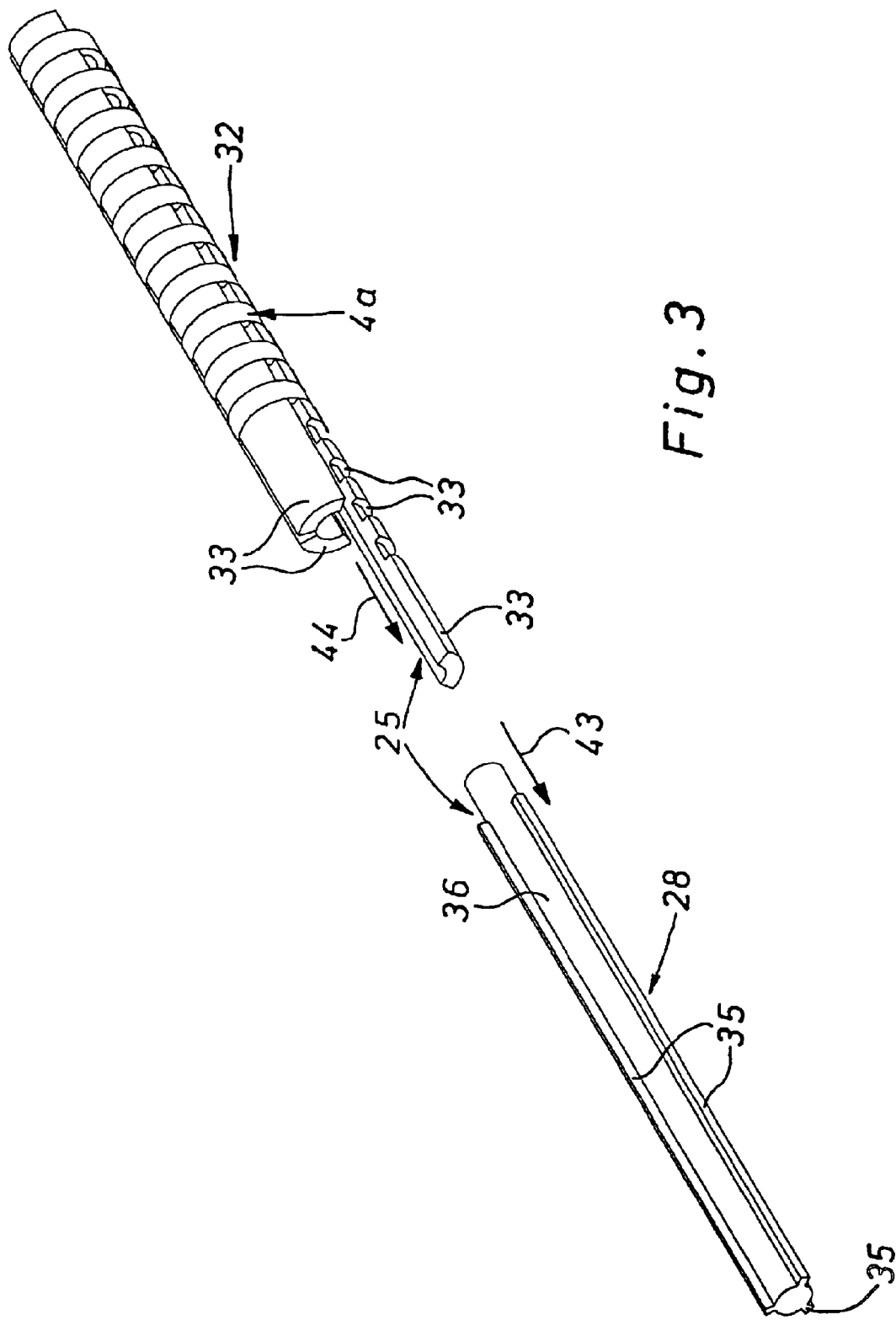

The next step is for the coil system part 4a produced to be removed from the winding tool 25. For this purpose firstly in accordance with FIG. 3 the tool core 28 is pulled out as indicated in FIG. 3 axially from the tool casing 32 as indicated by arrow 43. Then the casing segments 33, which are no longer held in their original position, separately and in sequence shifted radially inward with the result that their arcuate grooves 38 are moved clear of the drive coils 3 produced. Once they are moved out of engagement in this manner, the casing segments 33 may be drawn out as indicated by the arrow 44 axially from the internal space of the coil system part 4a (FIG. 3).

Figure 4:
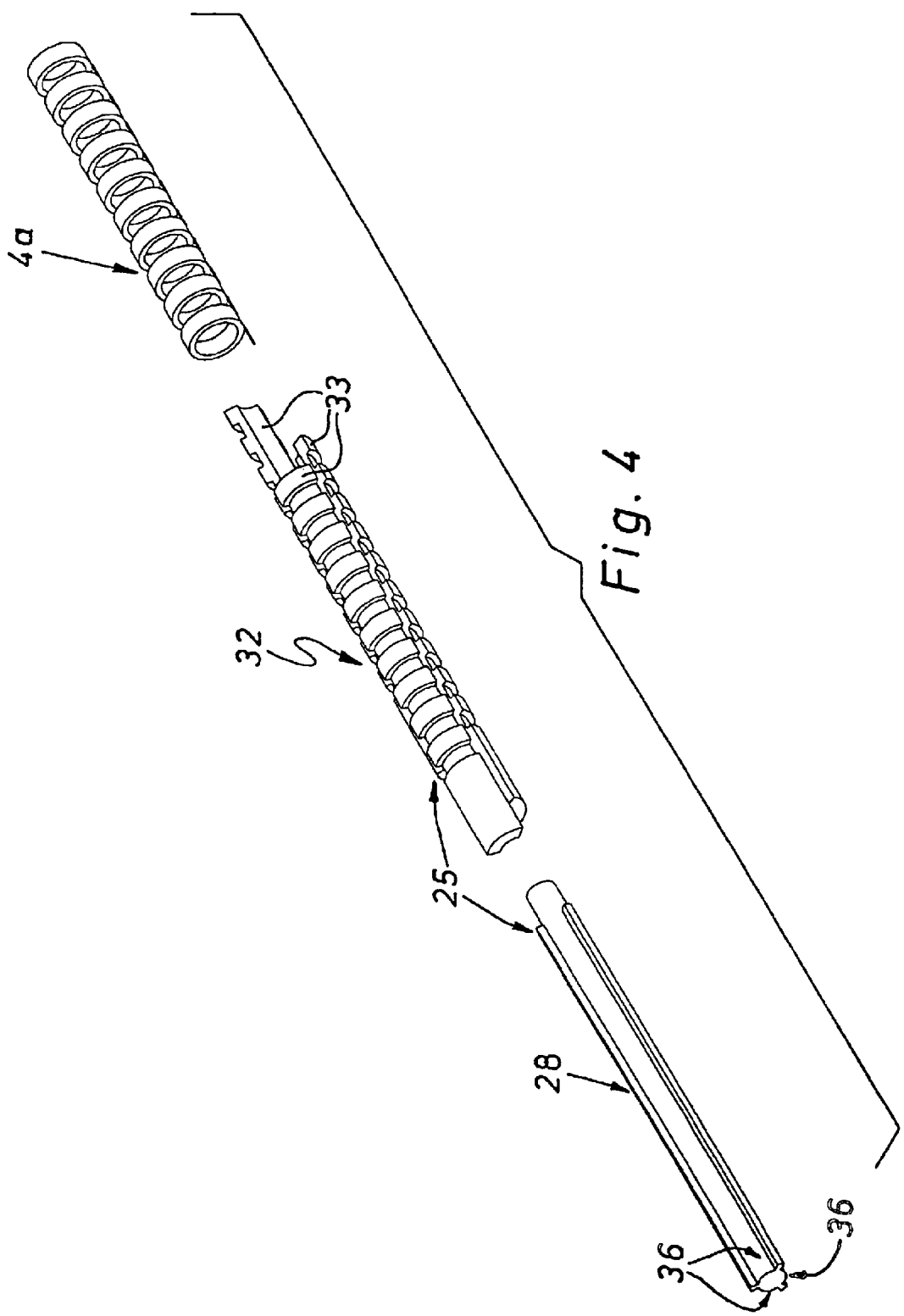

As a result there are then the components, separated as indicated in FIG. 4, in the form of the tool core 28, the casing segments 33 and more especially the coil system part 4a separated from the winding tool 25.

The coil system part 4a so manufactured now constitutes a self-supporting unit even without any additional coil carrier. The relative position of adjacent drive coils 3 is stabilized by the stiffening effect resulting from the baking operation, of the spanning sections 24 of the coil wire.

After the two coil system parts 4a and 4b have been produced in this manner such coil system parts 4a and 4b are arranged alongside each other in the manner appearing in FIG. 5 with the result that one drive coil 3a and 3b respectively assumes a position at the same axial level as an intermediate space 22b and 22a respectively of the respectively other coil system part. Starting with such a coordination the comb-like or pectinate coil system parts 4a and 4b are engaged with each other, on the manner indicated in FIG. 6, athwart their extent with a meshing effect. Within a respective coil system part 4a and 4b the spanning sections 24 practically constitute the comb back and the drive coils 3 represent the comb teeth of such structure, the drive coils 3a and 3b of all coil system parts 4a and 4b being coaxial to each other, in the condition fitting into one another, and the spanning sections 24 of the respective one coil system part 4a and 4b extending past the coil (inserted into the associated intermediate space 22a and 22b) of the other coil system part on the external periphery.

A similar procedure is adopted when the coil system to be manufactured entails having more than two coil system parts. In this case, within a respective coil system part, the axial intermediate spaces between adjacent drive-coils are selected to be so large that at least one drive coil of the other coil system part fits into it.

In this condition the rod-like return circuit means 15 may then be inserted. As an alternative to this, in connection with the production of a direct linear drive in accordance with FIG. 9, the coil system 2 so produced is inserted into a tubular return circuit means.

One advantage of the method of production explained is furthermore that there are many degrees of freedom as regards winding, since for instance the level of filling or furthermore the number of the winding chambers 26 containing windings may be selected as necessary. It is consequently possible to have coil system parts with different external diameters and different lengths using one and the same winding tool 25. After the coil system part has been converted into a dimensionally stable state by baking, the tool core may be demolded with a few movements of the hand.

Accordingly on the basis of a single winding tool different coil systems may be manufactured. Low tool costs and therefore low costs of manufacture result for the coil system.

What is claimed is:

1. An electrodynamic direct linear drive comprising:
   a magnet system comprising permanent magnets, said permanent magnets being arranged sequentially following each other axially, said magnet system being designed as a component of an output drive part able to be moved in relation to the coil system in the longitudinal direction thereof;
   a return circuit means; and
   a coil system disposed radially between said magnet system and said return circuit means, said coil system comprising at least two coil system parts that are plugged into each other to form a plurality of coaxially sequentially following drive coils which are adapted to be subjected to a switched exciting voltage and wherein axially adjacent drive coils of the coil system rest directly against each other free of intermediate gaps.

2. The direct linear drive as set forth in claim 1, characterized in that the drive coils contact the return circuit means directly or if anything with the interposition of a thin insulation layer.

3. The direct linear drive as set forth in claim 1, characterized in that the return circuit means is designed in a tubular form and surrounds the coil system coaxially.

4. The direct linear drive as set forth in claim 1, characterized in that the return circuit means is rod-like in design and is coaxially surrounded by the coil system.

5. The direct linear drive as set forth in claim 1, characterized in that the permanent magnets are annular in design.

6. The direct linear drive as set forth in claim 1, characterized in that the coil system comprises at least two coil system parts which are respectively continuously wired, and respectively comprise a plurality of drive coils, arranged spaced apart from each other coaxially, the drive coils of the coil system parts being arranged in alternating succession in relation to each other.

7. The direct linear drive as set forth in claim 6, characterized in that between axially adjacent drive coils of a respective coil system part there extends a spanning section of the coil wire, said spanning section bridging over the axial intermediate space level with the external periphery of the respective coil system part, such spanning section extending past the drive coil(s), arranged in the intermediate space, of the at least further coil system part on the external periphery.

8. The direct linear drive as set forth in claim 6, characterized in that the coil system parts are comb-like in structure and respectively interlock in a direction athwart their longitudinal axis.

9. An electrodynamic direct linear drive comprising:
a magnet system comprising permanent magnets, said permanent magnets being arranged sequentially following each other axially, said magnet system being designed as a component of an output drive part able to be moved in relation to the coil system in the longitudinal direction thereof;
a return circuit means; and
a coil system disposed radially between said magnet system and said return circuit means, said coil system having a plurality of coaxially sequentially following drive coils which are adapted to be subjected to a switched exciting voltage, wherein axially adjacent drive coils of the coil system rest directly against each other free of intermediate gaps, and wherein the coil system comprises at least two coil system parts which are respectively continuously wired, and respectively comprise a plurality of drive coils, arranged spaced apart from each other coaxially, the drive coils of the coil system parts being arranged in alternating succession in relation to each other, and wherein the coil system parts, as considered separately, respectively constitute a self-supporting, dimensionally stable structure with mutually coaxial drive coils.

10. A method for the manufacture of a coil system, having a plurality of coaxially sequentially following drive coils, of an electrodynamic direct linear drive, at least two continuously wired coil system parts being produced separately from one another, which respectively comprise a plurality of coaxially spaced drive coils, between which, on a level with the external periphery, a spanning section of the continuous coil wire extends so that a comb-like structure results, such comb-like coil system parts being plugged into each other athwart their longitudinal extent so that all drive coils are arranged coaxially in relation to each other and the spanning sections of the coil wire extend past the at least one drive coil inserted into the spanned intermediate space of the at least one further coil system part on the external periphery.

11. A method for the manufacture of a coil system, having a plurality of coaxially sequentially following drive coils, of an electrodynamic direct linear drive, at least two continuously wired coil system parts being produced separately from one another, which respectively comprise a plurality of coaxially spaced drive coils, between which, on a level with the external periphery, a spanning section of the continuous coil wire extends so that a comb-like structure results, such comb-like coil system parts being plugged into each other athwart their longitudinal extent so that all drive coils are arranged coaxially in relation to each other and the spanning sections of the coil wire extend past the at least one drive coil inserted into the spanned intermediate space of the at least one further coil system part on the external periphery and wherein the coil system is slipped over a rod-like return circuit means or inserted into a tubular return circuit means after the lateral insertion of the coil system parts into each other.

12. A method for the manufacture of a coil system, having a plurality of coaxially sequentially following drive coils, of an electrodynamic direct linear drive, at least two continuously wired coil system parts being produced separately from one another, which respectively comprise a plurality of coaxially spaced drive coils, between which, on a level with the external periphery, a spanning section of the continuous coil wire extends so that a comb-like structure results, such comb-like coil system parts being plugged into each other athwart their longitudinal extent so that all drive coils are arranged coaxially in relation to each other and the spanning sections of the coil wire extend past the at least one drive coil inserted into the spanned intermediate space of the at least one further coil system part on the external periphery and wherein the individual coil system parts are thermally bonded following the winding operation so that a self-supporting dimensionally stable structure results.

13. A method for the manufacture of a coil system, having a plurality of coaxially sequentially following drive coils, of an electrodynamic direct linear drive, at least two continuously wired coil system parts being produced separately from one another, which respectively comprise a plurality of coaxially spaced drive coils, between which, on a level with the external periphery, a spanning section of the continuous coil wire extends so that a comb-like structure results, such comb-like coil system parts being plugged into each other athwart their longitudinal extent so that all drive coils are arranged coaxially in relation to each other and the spanning sections of the coil wire extend past the at least one drive coil inserted into the spanned intermediate space of the at least one further coil system part on the external periphery and wherein the winding of the coil system parts is performed on a winding tool, which possesses axially spaced winding chambers resembling annular grooves for winding the drive coils.

14. The method as set forth in claim 13, characterized in that a winding tool is utilized, which possesses an elongated tool core and a tool casing placed on the external periphery of the tool core, such tool casing defining the winding chambers, the tool casing comprising a plurality of casing segments placed in the peripheral direction of the tool core with a space from each other, which for the removal of a wound coil system part are shifted radially inward after the tool core has been previously removed.

15. The method as set forth in claim 14, characterized in that the tool core employed possesses longitudinal ribs distributed about the periphery thereof, the casing segments being inserted in the intermediate spaces between the adjacent longitudinal ribs.

* * * * *